(12) United States Patent
Li et al.

(10) Patent No.: US 10,956,685 B2
(45) Date of Patent: *Mar. 23, 2021

(54) ALIGNMENT OF VIDEO AND TEXTUAL SEQUENCES FOR METADATA ANALYSIS

(71) Applicant: Disney Enterprises, Inc., Burbank, CA (US)

(72) Inventors: Boyang Li, San Mateo, CA (US); Leonid Sigal, Vancouver (CA); Pelin Dogan, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/786,804

(22) Filed: Feb. 10, 2020

(65) Prior Publication Data

US 2020/0175232 A1 Jun. 4, 2020

Related U.S. Application Data

(63) Continuation of application No. 16/028,183, filed on Jul. 5, 2018, now Pat. No. 10,558,761.

(51) Int. Cl.
*G06F 40/45* (2020.01)
*G06K 9/00* (2006.01)
(Continued)

(52) U.S. Cl.
CPC ......... *G06F 40/45* (2020.01); *G06K 9/00718* (2013.01); *G06K 9/00879* (2013.01); *G06K 9/6256* (2013.01); *G06N 5/046* (2013.01)

(58) Field of Classification Search
CPC ........ G06F 17/30; G06F 40/45; G06F 40/295; G06F 40/30; G06F 3/011; G06F 16/36;
(Continued)

(56) References Cited

U.S. PATENT DOCUMENTS 6,654,930 B1 * 11/2003 Zhou .................... G11B 27/031
715/202
6,751,339 B1 * 6/2004 Windle ................. G06T 11/001
382/108

(Continued)

OTHER PUBLICATIONS

Song et al., "Hierarchical LSTMs with Adaptive Attention for Video Captioning", Aug. 2015 (Year: 2015).

(Continued)

*Primary Examiner* — Gerald Gauthier
(74) *Attorney, Agent, or Firm* — Patterson + Sheridan, LLP (57) ABSTRACT

Systems, methods and computer program products related to aligning heterogeneous sequential data are disclosed. Video data in a media presentation and textual data corresponding to content of the media presentation are received. An action related to aligning the video data and the textual data is determined using an alignment neural network, such that the video data and the textual data are at least partially aligned following the action. The alignment neural network includes a first fully connected layer that receives as input the video data, the textual data, and data relating to a previously determined action by the alignment neural network related to aligning the video data and the textual data. The determined action related to aligning the video data and the textual data is performed.

20 Claims, 10 Drawing Sheets

(51) Int. Cl.
  *G06K 9/62* (2006.01)
  *G06N 5/04* (2006.01)
(58) Field of Classification Search
  CPC .... G06F 40/211; G06K 9/00; G06K 9/00718;
    G06K 9/00879; G06K 9/6256; G06K
    9/4628; G06K 9/4671; G06K 9/6267;
    G06K 9/6293; G06K 9/66; G06K
    9/00241; G06K 9/00664; G06K 9/00805;
    G06K 9/4642; G06K 9/6271; G06N
    5/046; G06N 3/0427; G06N 3/0445;
    G06N 3/0454; G06N 3/0472; G06N
    3/0481; G06N 3/08; G09B 5/02; G10L
    17/02; G10L 15/26; G10L 19/083; H04N
    21/2541; H04N 21/26603; H04N 19/179;
    H04N 21/4828; G05D 1/0088
  USPC ...... 345/473, 582; 348/42, 515, 700, 46, 47;
    382/103, 108, 170; 704/254, 2; 715/721,
    715/865, 202; 725/32; 386/281;
    455/413
  See application file for complete search history.

(56) References Cited

U.S. PATENT DOCUMENTS

| | | | | |
|---|---|---|---|---|
| 6,912,688 | B1 * | 6/2005 | Zhou | G11B 27/34 715/202 |
| 8,438,595 | B1 * | 5/2013 | Kannan | H04N 21/8547 725/32 |
| 8,531,473 | B2 * | 9/2013 | Tzur | G06T 15/04 345/582 |
| 9,208,179 | B1 | 12/2015 | Song et al. | |
| 10,366,166 | B2 * | 7/2019 | Yu | G06K 9/6273 |
| 10,558,750 | B2 * | 2/2020 | Lu | G06K 9/481 |
| 10,599,769 | B2 * | 3/2020 | Osbourne | G06N 3/0454 |
| 10,733,980 | B2 * | 8/2020 | Kotri | G06N 3/0445 |
| 10,776,408 | B2 * | 9/2020 | Altaf | G06F 16/36 |
| 10,789,288 | B1 * | 9/2020 | Ranzinger | G06N 3/04 |
| 10,817,732 | B2 * | 10/2020 | Porter | G06K 9/00805 |
| 10,823,572 | B2 * | 11/2020 | Huang | G01C 21/20 |
| 10,832,034 | B2 * | 11/2020 | Liu | G06K 9/00275 |
| 10,832,436 | B2 * | 11/2020 | Lam | G06T 7/13 |
| 2002/0093591 | A1 * | 7/2002 | Gong | G06F 16/7834 348/515 |
| 2003/0076334 | A1 * | 4/2003 | Dumitras | H04N 19/23 345/582 |
| 2003/0218696 | A1 * | 11/2003 | Bagga | G06F 16/7844 348/700 |
| 2004/0051783 | A1 * | 3/2004 | Chellappa | H04N 13/261 348/46 |
| 2008/0090553 | A1 * | 4/2008 | Wan | H04M 3/5315 455/413 |
| 2008/0295040 | A1 * | 11/2008 | Crinon | H04N 7/152 715/865 |
| 2010/0007665 | A1 * | 1/2010 | Smith | G06T 13/40 345/473 |
| 2010/0104184 | A1 * | 4/2010 | Bronstein | H04N 21/4402 382/170 |
| 2010/0299131 | A1 * | 11/2010 | Lanham | G10L 15/10 704/2 |
| 2010/0332214 | A1 * | 12/2010 | Shpalter | G06F 40/51 704/2 |
| 2011/0054901 | A1 * | 3/2011 | Qin | G06F 40/45 704/254 |
| 2012/0113229 | A1 * | 5/2012 | Hassebrook | G06T 7/521 348/47 |
| 2012/0206567 | A1 * | 8/2012 | Zafarifar | G06K 9/3266 348/42 |
| 2013/0067333 | A1 * | 3/2013 | Brenneman | H04N 21/2353 715/721 |
| 2015/0234919 | A1 * | 8/2015 | Baker | G06F 3/0482 715/721 |
| 2015/0312652 | A1 * | 10/2015 | Baker | H04N 21/8456 386/281 |
| 2016/0342895 | A1 | 11/2016 | Gao et al. | |
| 2017/0083623 | A1 | 3/2017 | Habibian et al. | |
| 2017/0127016 | A1 | 5/2017 | Yu et al. | |
| 2017/0150235 | A1 * | 5/2017 | Mei | G06F 40/253 |
| 2017/0213469 | A1 * | 7/2017 | Elchik | G06F 40/186 |
| 2017/0289589 | A1 * | 10/2017 | Koumchatzky | H04N 21/251 |
| 2017/0293638 | A1 | 10/2017 | He et al. | |
| 2017/0329395 | A1 * | 11/2017 | Flordal | G06T 11/001 |
| 2017/0357720 | A1 * | 12/2017 | Torabi | G06N 3/0454 |
| 2018/0124331 | A1 * | 5/2018 | Min | G06K 9/00758 |
| 2018/0204111 | A1 * | 7/2018 | Zadeh | G06K 9/3233 |
| 2018/0285456 | A1 * | 10/2018 | Nichkawde | G10L 13/00 |
| 2019/0058886 | A1 * | 2/2019 | Chen | H04N 19/1887 |
| 2019/0080697 | A1 * | 3/2019 | Grancharov | G10L 17/20 |
| 2019/0130187 | A1 * | 5/2019 | Hu | G06K 9/00718 |
| 2019/0147224 | A1 * | 5/2019 | Li | G06K 9/4609 382/103 |
| 2020/0012725 | A1 * | 1/2020 | Li | G06K 9/6256 |
| 2020/0175232 | A1 * | 6/2020 | Li | G06N 3/0445 |

OTHER PUBLICATIONS

Yao et al., "Describing Videos by Exploiting Temporal Structure", Oct. 2015 (Year: 2015).
Donahue et al., "Long-term Recurrent Convolutional Networks for Visual Recognition and Description", May 2016 (Year: 2016).
Li et al., "Visual to Text Survey of Image and Video Captioning", Aug. 2019 (Year: 2019).
Xu et al., "Learning Multimodal Attention LSTM Networks for Video Captioning", MM '17: Proceedings of the 25th ACM international conference on Multimedia Oct. 2017 pp. 537-545 https:doi.org/10.1145/3123266.3123448 (Year: 2017).
Pan et al., "Hierarachical Recurrent Neural Encoder for Video Representation with Application to Captioning", 2016 IEEE Conference on Computer Vision and Pattern Recognition (Year: 2016).

* cited by examiner

| | VIDEO STACK 430 | TEXT STACK 420 | MATCHED STACK 460 | ACTION STACK 450 |
|---|---|---|---|---|
| INITIAL | ⓐ ⓑ ⓒ | ① ② ③ | | |
| POP CLIP | ⓑ ⓒ | ① ② ③ | | PC |
| POP SENT | ⓐ ⓑ ⓒ | ② ③ | | PS |
| MATCH | ⓑ ⓒ | ② ③ | [ⓐ①] | M |
| MATCH-RETAIN-C | ⓐ ⓑ ⓒ | ② ③ | [ⓐ①] | MRC |
| MATCH-RETAIN-S | ⓑ ⓒ | ① ② ③ | [ⓐ①] | MRS |

*FIG. 9*

|  | SEQ A | SEQ B | SEQ C | MATCHED STACK |
|---|---|---|---|---|
| INITIAL | ⓐⓑⓒ | ①②③ | ⓧⓨⓩ | |
| 1. M-R(110) | ⓐⓑⓒ | ①②③ | ⓧⓨⓩ | [ⓐ①] |
| 2. POP A | ⓑⓒ | ①②③ | ⓧⓨⓩ | [ⓐ①] |
| 3. POP B | ⓑⓒ | ②③ | ⓧⓨⓩ | [ⓐ①] |
| 4. M-R(011) | ⓑⓒ | ②③ | ⓨⓩ | [②ⓧ][ⓐ①] |

*FIG. 10*

ALIGNMENT OF VIDEO AND TEXTUAL SEQUENCES FOR METADATA ANALYSIS

CROSS-REFERENCE TO RELATED APPLICATIONS

This application is a continuation of co-pending U.S. patent application Ser. No. 16/028,183, filed Jul. 5, 2018, which is herein incorporated by reference in its entirety.

BACKGROUND

Field of the Invention

The present invention relates to computerized neural networks, and more specifically, to a neural network for aligning heterogeneous sequential data.

Description of the Related Art

Alignment of sequential data is a common problem in many different fields, including molecular biology, natural language processing, historic linguistics, and computer vision, among other fields. Aligning heterogeneous sequences of data, with complex correspondences, can be particularly complex. Heterogeneity refers to the lack of a readily apparent surface matching. For example, alignment of visual and textual content can be very complex. This is particularly true where one-to-many and one-to-none correspondences are possible, as in alignment of video from a film or television show with a script relating to the film or television show. One or more embodiments herein describe use of a computerized neural network to align sequential heterogeneous data, for example visual and textual data.

SUMMARY

Embodiments described herein include a method for aligning heterogeneous sequential data. The method includes receiving video data in a media presentation and textual data corresponding to content of the media presentation. The method further includes determining an action related to aligning the video data and the textual data using an alignment neural network, such that the video data and the textual data are at least partially aligned following the action. The alignment neural network includes a first fully connected layer that receives as input the video data, the textual data, and data relating to a previously determined action by the alignment neural network related to aligning the video data and the textual data. The method further includes performing the determined action related to aligning the video data and the textual data.

Embodiments described herein further include a computer program product for aligning heterogeneous sequential data. The computer program product includes a computer-readable storage medium having computer-readable program code embodied therewith. The computer-readable program code includes computer-readable program code configured to perform an operation. The operation includes receiving video data in a media presentation and textual data corresponding to content of the media presentation. The operation further includes determining an action related to aligning the video data and the textual data using an alignment neural network, such that the video data and the textual data are at least partially aligned following the action. The alignment neural network includes a first fully connected layer that receives as input the video data, the textual data, and data relating to a previously determined action by the alignment neural network related to aligning the video data and the textual data. The operation further includes performing the determined action related to aligning the video data and the textual data.

Embodiments described herein further include a system. The system includes a processor and a memory containing a program that, when executed on the processor, performs an operation. The operation includes receiving video data in a media presentation and textual data corresponding to content of the media presentation. The operation further includes determining an action related to aligning the video data and the textual data using an alignment neural network, such that the video data and the textual data are at least partially aligned following the action. The alignment neural network includes a first fully connected layer that receives as input the video data, the textual data, and data relating to a previously determined action by the alignment neural network related to aligning the video data and the textual data. The operation further includes performing the determined action related to aligning the video data and the textual data.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Alignment of heterogeneous sequential data sequences, like text and video data, can require sophisticated extraction of comparable feature representations. This can be performed, for example, by a deep neural network. One solution to this alignment problem involves two stages that are performed separately: (1) the learning of a similarity metric between elements in the sequences and (2) finding the optimal alignment between the sequences. Alignment techniques based on dynamic programming, such as Dynamic Time Warping (DTW) and Canonical Time Warping (CTW), use this structure.

These approaches, however, are disadvantaged by the separation of the two stages. Further, these approaches rely on the first-order Markov assumptions that future alignment decisions are independent of any history beyond the immediate past. But contextual information that can improve alignment decisions may be scattered over an entire data sequence. For example, having knowledge of the narrative structure of an entire movie, and not just the immediately preceding scene or scenes, may help to align video shots to their textual sentence descriptions.

To address these limitations, one or more embodiments herein relate to an end-to-end neural architecture for heterogeneous sequence alignment. In one embodiment, this architecture represents the state of partially aligned sequences using long short-term memory (LSTM) chains as well as LSTM chains for the matched content and historical alignment decisions. Recurrent LSTM networks collectively capture the decision context, which is then classified into one of the available alignment actions. Compared to a traditional two-stage solution, the network can be optimized end-to-end, allowing the similarity metric to be specifically optimized for the alignment task. In addition, the network can utilize previous matched content (and decisions) to inform future alignment decisions in a non-Markov manner. For example, information determined earlier in the matching process (like, for example, matching a person's face with a character at the beginning of a move), can be used later in the matching process (by, for example, using that earlier match information to identify the same face when it appears later). Further, if one sequence is sampled at a coarser rate, decision context that learns alignment frequency may prove to be particularly useful.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In the context of the present invention, a user may access applications (e.g., an alignment neural network or associated applications) or related data available in the cloud. For example, the alignment neural network could execute on a computing system in the cloud and identify alignment actions for data sequences. In such a case, the alignment neural network could retrieve data for alignment from a storage location in the cloud and store alignment data in a storage location in the cloud. Doing so allows a user to access this information from any computing system attached to a network connected to the cloud (e.g., the Internet).

Figure 1:
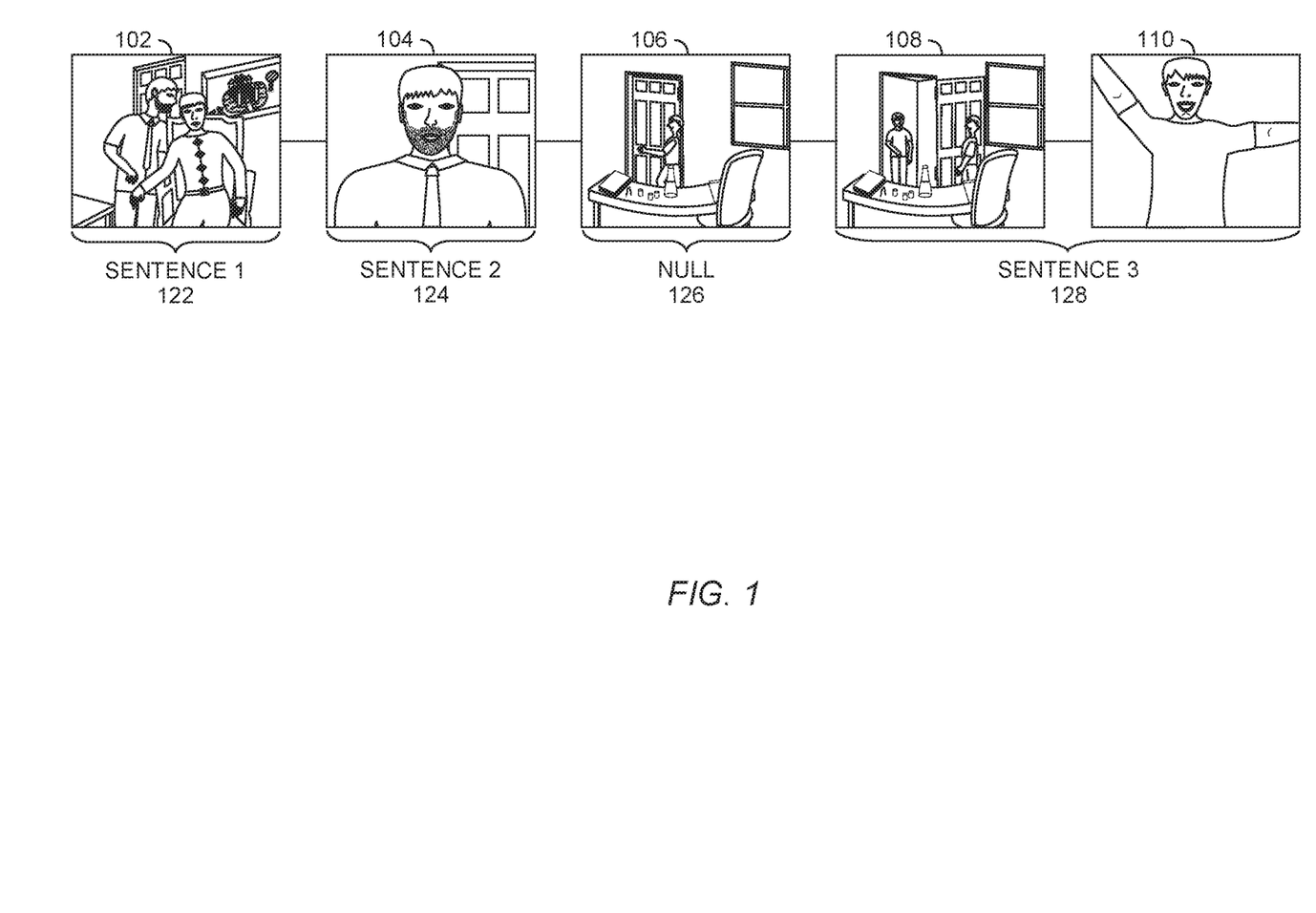
FIG. 1 is an illustration of a video sequence and a text sequence for alignment, according to an embodiment.

Referring now to FIG. 1, FIG. 1 is an illustration of a video sequence and a text sequence for alignment, according to an embodiment. For example, the video clips 102, 104, 106, 108, and 110 represent consecutive video clips, for example video shots from a movie. The sentences 122, 124, 126, and 128 represent consecutive sentences, for example sentences from the movie's script, to which the video clips 102-110 can be aligned. The video clips 102, 104, 106, 108, and 110 can be segmented using any suitable method or algorithm, including any suitable shot boundary detection algorithm. In an embodiment, a neural network architecture described herein can handle one-to-many matching, so over-segmentation of the video clips will be handled appropriately.

In the example illustrated in FIG. 1, the video clip 102 is aligned with the textual sentence 122. The video clip 104 is aligned with the textual sentence 124. The video clip 106 does not have a corresponding textual sentence, and so it is aligned with null 126. The video clips 108 and 110 are both aligned with the sentence 128.

Figure 2:
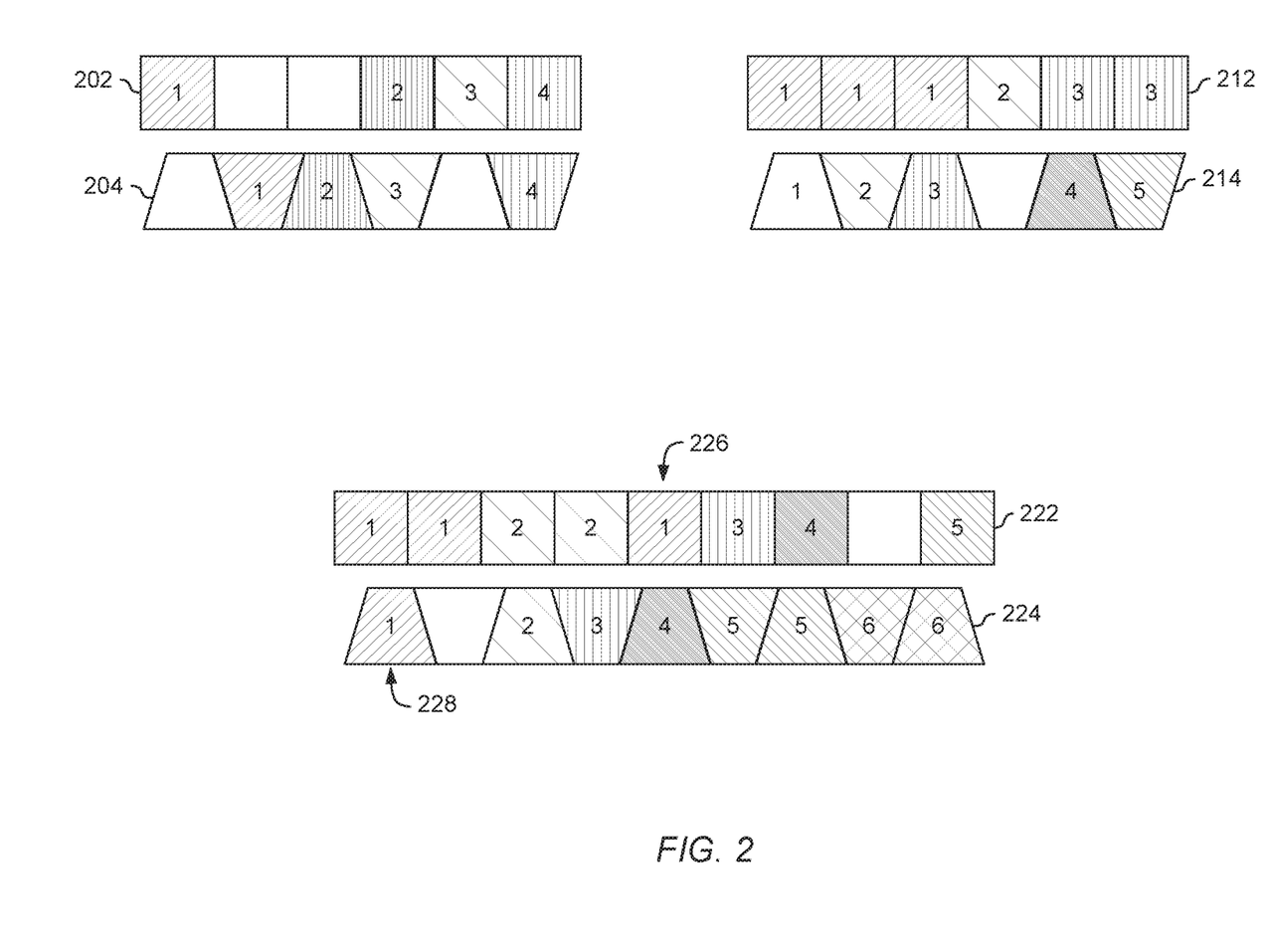
FIG. 2 is a block diagram illustrating different types of sequence correspondence, according to an embodiment.

FIG. 2 is a block diagram illustrating different types of sequence correspondence, according to an embodiment. The sequences 202 and 204 illustrate a one to one matching, in which some data has no correspondence. Each numbered block in the sequence 202 corresponds to the block with the same number in the sequence 204. The blocks without numbers have no correspondence.

The sequences 212 and 214 illustrate one to many matching. In these sequences, one block in the sequence 214 can correspond to multiple blocks in the sequence 214. For example, the block labeled "1" in the sequence 214 corresponds to three blocks labeled "1" in the sequence 212. Similarly, the block labeled "3" in the sequence 214 corresponds to the two blocks labeled "3" in the sequence 212.

The sequences 222 and 224 represent a non-monotonic situation where the matching does not necessarily proceed from left to right. For example, the sequence 222 includes blocks labeled 1, 1, 2, 2, 1, 3, 4, blank, and 5. The sequence 224 includes blocks labeled 1, blank, 2, 3, 4, 5, 5, 6, and 6. Again, the blocks with matching numbers in the sequences 222 and 224 correspond. But here, in the sequence 222, the block 226 (labeled "1") occurs after two blocks labeled "2," while the corresponding block 228 is the first block in the sequence 224. Thus, the matching does not necessarily proceed from left to right.

Figure 3:
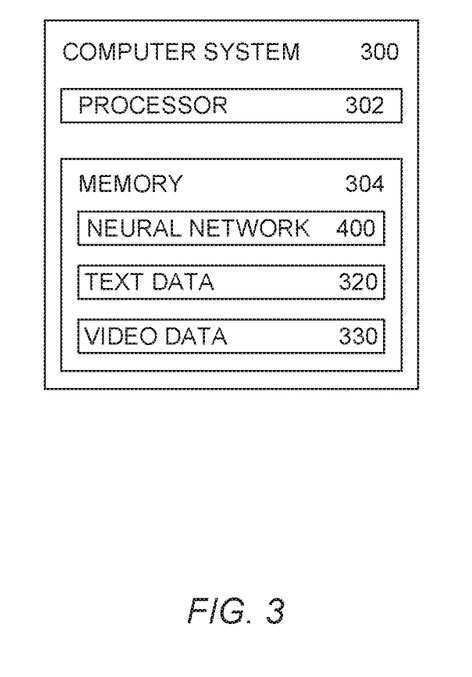
FIG. 3 is a simplified block diagram illustrating a computer system for use in aligning text and video data, according to an embodiment.

FIG. 3 is a simplified block diagram illustrating a computer system 300 with a neural network 400, according to an embodiment. The computer system 300 includes a processor 302. The processor 302 may be any computer processor capable of performing the functions described herein. Further, the processor 302 may be a single processor, multiple processors, a processor with a single core, a processor with multiple cores, or any other suitable configuration.

The computer system 300 further includes memory 304. Although memory 304 is shown as a single entity, the memory 304 may include one or more memory devices having blocks of memory associated with physical addresses, such as random access memory (RAM), read only memory (ROM), flash memory or other types of volatile and/or non-volatile memory. The memory 304 includes a neural network for aligning data sequences, for example the neural network 400 illustrated in FIG. 4. The memory 304 further includes data for alignment, for example the text data 320 and the video data 330.

In an embodiment, the computer system 300 can be an individual computer. In another embodiment, the components of computer system 300 can be spread across a networked computer environment. For example, the neural network 400 could be stored in a server computer, or data repository, accessible via a communications network. The text data 320 and the video data 330 could be stored on the same server computer, a different server computer, in a data repository accessible via a communications network, or in any other suitable location. During operation, the neural network 400 could access the text data 320 and video data 330 via a communications network.

Figure 4:
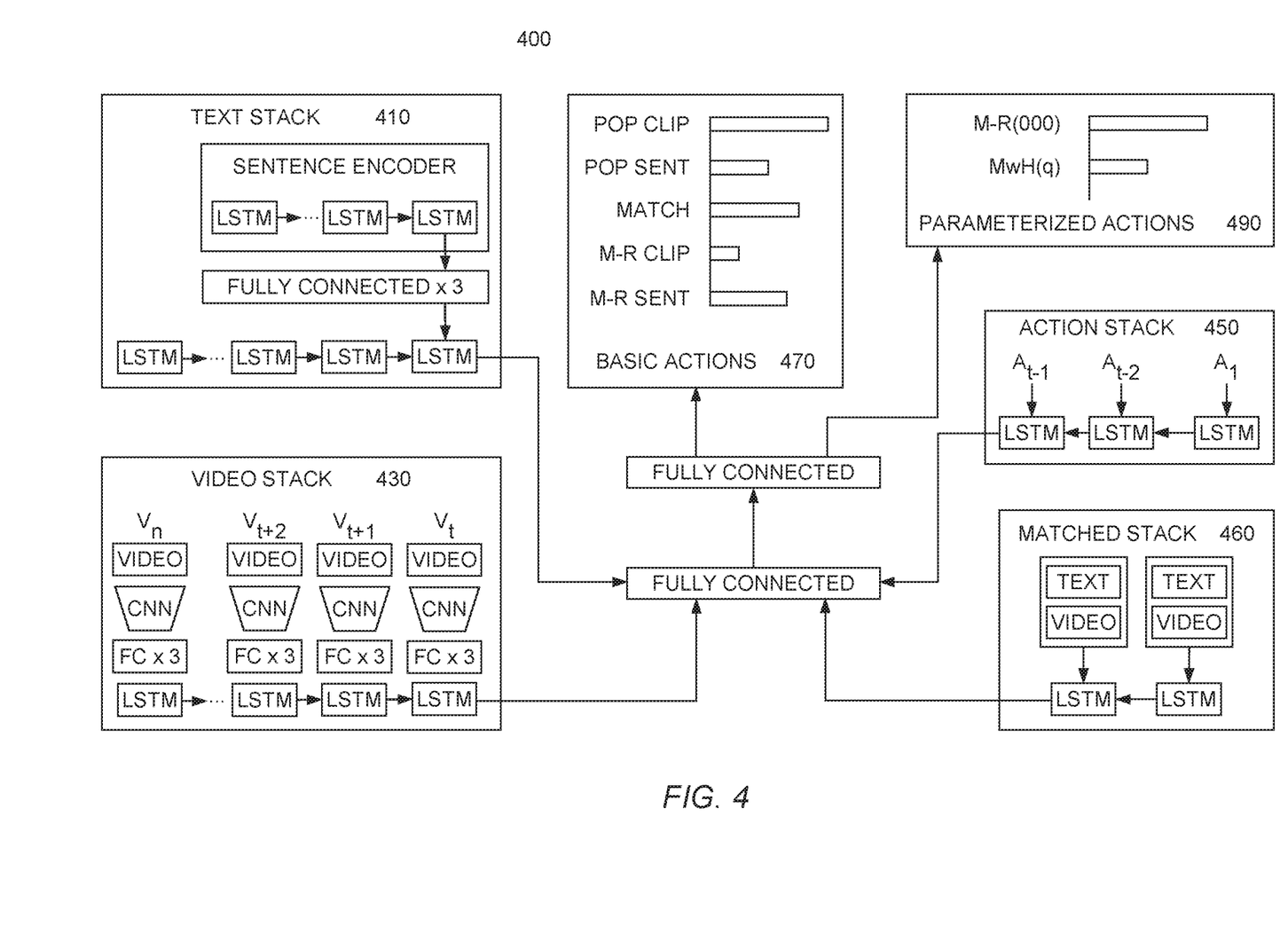
FIG. 4 is a block diagram illustrating a neural network architecture for aligning text and video data, according to an embodiment.

FIG. 4 is a block diagram illustrating a neural network architecture 400 for aligning text and video data, according to an embodiment. The goal of the neural network architecture 400 is to predict a sequence of alignment actions to process and align the input textual sentences and video clips. The alignment actions define the alignment between input sequences by manipulating the contents of long short-term memory (LSTM) neural network layers that encode an input visual sequence (the video stack 430) and an input textual sequence (the text stack 410) to be matched. The basic actions 470 are examples of alignment actions. The manipulations in the basic actions 470 may be seen as stack operations because they either remove or insert an element at the first position of the LSTM network. For example, elements at the first position in the text stack 410 or video stack 430 can be removed (popped) or matched.

When two elements are matched, they are stored in a separate matched stack 460. In addition to features from unmatched sequences of video clips and sentences, the framework also takes into account the complete sequence of previous alignment actions (the action stack 450), as well as those alignments themselves (the matched stack 460). Thus, selection of alignment actions is informed by rich context that comes from previous alignment history.

As illustrated in FIG. 4, the blocks labeled LSTM represent long short-term memory (LSTM) layers in the neural network 400. The blocks labeled CNN represent convolutional neural network (CNN) layers in the neural network 400. The blocks labeled Fully Connected or FC represent fully connected neural network layers in the neural network 400. Each part of the neural network 400 will be described in more detail in a subsequent figure. The text stack 410 is described in more detail with regard to FIG. 6. The video stack 430 is described in more detail with regard to FIG. 7. And the remaining parts of the neural network are described in more detail with regard to FIG. 8.

Figure 5:
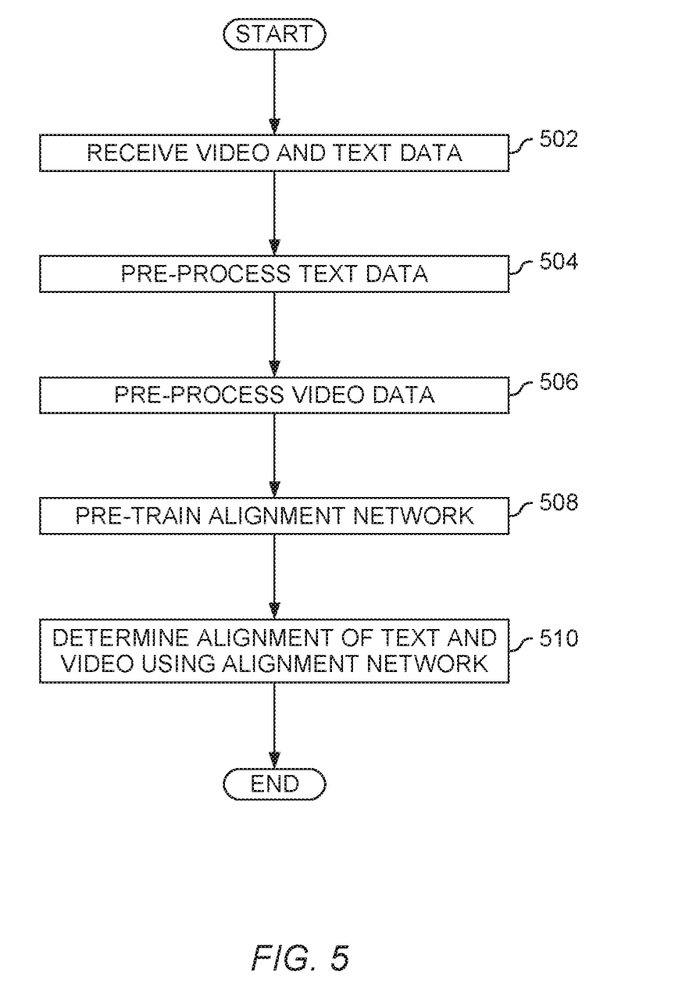
FIG. 5 is a flow chart illustrating aligning text and visual data using a neural network, according to an embodiment.

FIG. 5 is a flow chart illustrating aligning text and video data using a neural network, like the neural network 400 illustrated in FIG. 4, according to an embodiment. At block 502, the neural network 400 receives video and text data for alignment. As discussed above, the video data can be segmented into video shots using any suitable algorithm or method. For example, the video data can be made up of individual frames, sequences of several frames, or longer sequences. The text data can be separated into sentences, or into any other suitable grouping. While embodiments herein are discussed as operating on textual sentences, the text could instead be grouped into individual words, paragraphs, or any other suitable grouping.

Figure 6:
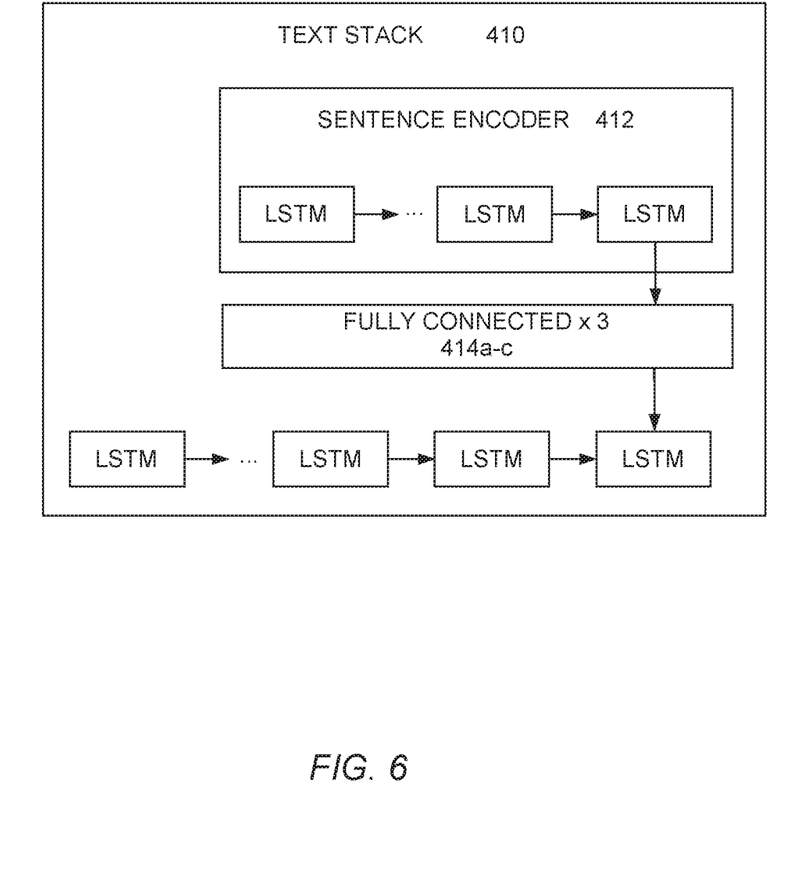
FIG. 6 is a block diagram illustrating processing of text data for alignment by a neural network, according to an embodiment.

At block 504, the text data is pre-processed for alignment by the neural network 400. This is discussed in more detail with regard to FIG. 6. FIG. 6 is a block diagram illustrating processing of text data for alignment by a neural network, according to an embodiment. In an embodiment, the input text is parsed into sentences $S_1 \ldots S_M$ by the sentence encoder 412, each of which contains a sequence of words. Each unique word can be transformed into an embedding vector. For example, the word can be transformed into an embedding vector pre-trained using GloVe, as described in: J. Pennington, R. Socher, and C. D. Manning, *Glove: Global vectors for word representation*, Empirical Methods in Natural Language Processing (EMNLP) 1532-1543 (2014). The sentence can then be encoded using a 2-layer LSTM recurrent network, where the hidden state of the first layer, $h_t^1$, is fed to the second layer:

$$h_t^{(1)}, c_t^{(1)} = \text{LSTM}(x_t, h_{t-1}^{(1)}, c_{t-1}^{(1)})$$

$$h_t^{(2)}, c_t^{(2)} = \text{LSTM}(h_t^{(1)}, h_{t-1}^{(2)}, c_{t-1}^{(2)})$$

In these expressions, $h_t^{(1)}$ and $c_t^{(2)}$ are the memory cells for the two layers, respectively. The variable $x_t$ represents the word embedding for time step t. The sentence is represented as the vector obtained by the transformation of the last hidden state $h_t^2$ by three fully connected layers (e.g., fully connected layers 414a-c illustrated in FIG. 6) using a rectified linear unit (ReLU) activation function. A ReLU activation function is merely an example, and a different activation function could be used.

Figure 7:
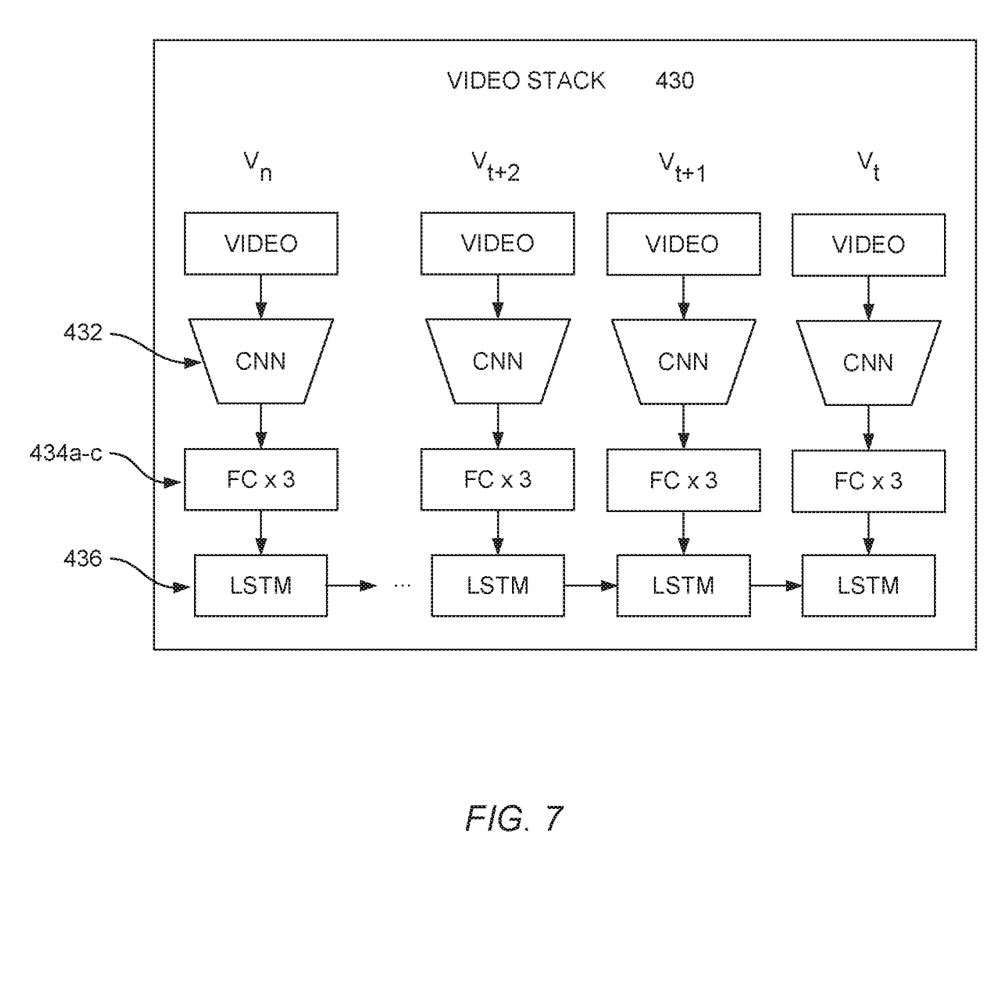
FIG. 7 is a block diagram illustrating processing of video data for alignment by a neural network, according to an embodiment.

Returning to FIG. 5, at block 506 the video data is pre-processed for alignment by the neural network 400. This is discussed in more detail with regard to FIG. 7. FIG. 7 is a block diagram illustrating processing of video data for alignment by a neural network, according to an embodiment. Labels $V_t$, $V_{t+1}$, $V_{t+2}$, and $V_N$ denote video clips for matching. The video clips are passed through a convolutional neural network (CNN) 432, three fully connected layers 434a-c, and an LSTM 436.

In an embodiment, features from the video can be extracted using the activation of a fully connected layer. For example, features from the video clips $V_t, V_{t+1}, V_{t+2}, \ldots V_N$ can be extracted using the first fully connected layer in the VGG-16 network described in K. Simonyan and A. Zisserman, Very Deep Convolutional Networks for Large-Scale Image Recognition, arXiv:1409.1556 (2014), which produces a 4096-dim vector per frame. As each of the video clips $V_t, V_{t+1}, V_{t+2}, \ldots V_N$ is likely relatively short and homogeneous, mean pooling can be performed over all frames in the video. This yields a feature vector for the entire clip. This vector is transformed with three fully connected layers (e.g., fully connected layers 434a-c) using a ReLU activation function. A ReLU activation function is merely an example, and a different activation function could be used. The end result is an encoded video vector $v_i$ for the $i^{th}$ clip.

Returning again to FIG. 5, at block 508 the alignment neural network 400 is pre-trained. Before feeding the text and video data to the alignment neural network 400, the network can be pre-trained. In an embodiment, the alignment neural network 400 can be a supervised network, and can be pre-trained using tagged video clips and text sentences. For example, in an embodiment, for a ground-truth pair $(V_i, S_i)$ an asymmetric similarity defined by the following expression could be used:

$$F(v_i, s_i) = -\|\max(0, v_i - s_i)\|^2$$

This similarity function takes the maximum value 0 when $s_i$ is positioned to the upper right of $v_i$ in the vector space. That is, $\forall j, s_{i,j} \geq v_{i,j}$. When that condition is not satisfied, the similarity decreases. This similarity function makes particular sense for the example of aligning a text script with video shots, because video typically contains more information than is being described in the text script.

In this example embodiment, the ranking loss objective below could be adopted by randomly sampling a contrasting video clip V' and a contrastive sentence S' for every ground truth pair. Minimizing the loss function maintains that the similarity of the contrastive pair is below the true pair by at least the margin α:

$$\mathcal{L} = \sum_i (\mathbb{E}_{v' \neq v_i} \max\{0, \alpha - F(v_i, s_i) + F(v', s_i)\} + \mathbb{E}_{s' \neq s_i} \max\{0, \alpha - F(v_i, s_i) + F(v_i, s')\})$$

Figure 8:
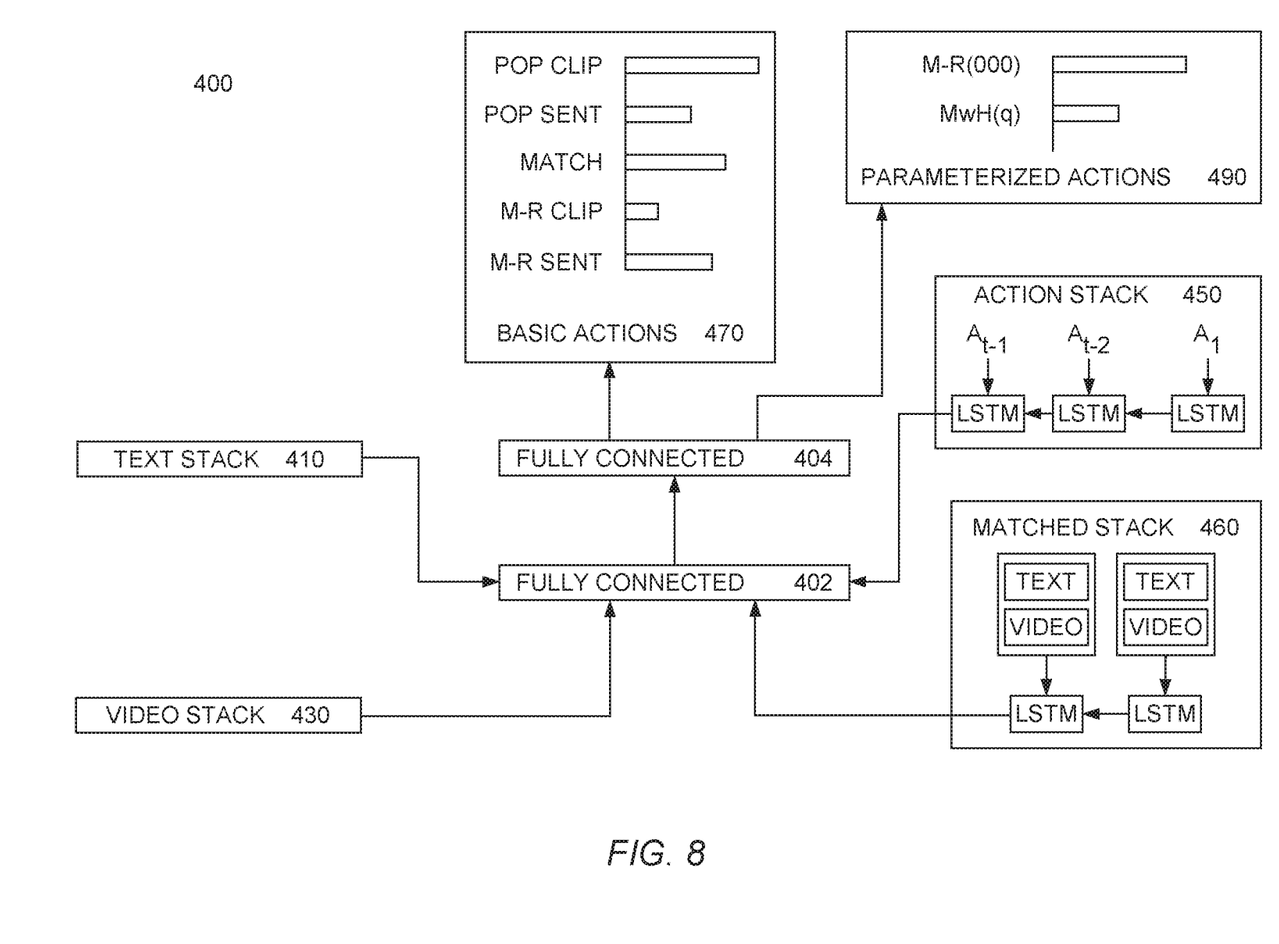
FIG. 8 is a block diagram illustrating a neural network architecture for aligning text and video data, according to an embodiment.

Returning again to FIG. 5, at block 510 the alignment neural network 400 is used to determine the alignment of the input text and video sequences. This is described in more detail with regard to FIG. 8. FIG. 8 is a block diagram illustrating a neural network architecture for aligning text and video data, according to an embodiment. At blocks 504 through 508, the neural network 400 is pre-trained and text and video data are pre-processed to embed both into the same vector space. In one embodiment, one could align the text and video data by maximizing the collective similarity over the matched video clips and sentences.

Taking this approach, however, ignores the temporal structures of the text and video sequences and can lead to degraded performance. First, heterogeneous surface forms, such as video and text, can conceal the true similarity structure. Understanding the entire content may be necessary for alignment. Second, the video and text data may correspond in complex ways, like many-to-one matching and unmatched content. The neural network 400 can accommodate this. Third, contextual information that is useful for learning similarity metrics may be scattered over the entire sequence. Thus, it may be important to consider historical data, and the future, when making the alignment decision. An end-to-end network where gradient from alignment decisions can inform content understanding and similarity metric learning can achieve this.

In an embodiment, the neural network 400 includes these characteristics. The architecture of the neural network 400 allows storage of historic information, and the future portion of the sequences, for matching in LSTM recurrent networks. Hidden states in the neural network 400 can be considered to encode information throughout the sequences. The concatenated hidden states are classified into one of the available alignment actions, which subsequently modifies the content of these LSTM networks.

As discussed above with regard to FIG. 7, in an embodiment, at time step t the video stack 430 contains the sequence of video clips yet to be processed. The direction of the LSTM (e.g., LSTM 436 illustrated in FIG. 7) goes from $V_N$ to $V_t$, which allows the information to flow from the future clips to the current clip. The hidden state of the video stack 430 can be denoted as $h_t^V$. Similarly, as discussed with regard to FIG. 6, above, the text stack 420 contains the sentence structure yet to be processed $S_t, S_{t+1}, \ldots, S_M$. The hidden state of the text stack 420 can be denoted as $h_t^S$.

In an embodiment, the neural network 400 further includes a third stack, the action stack 450, which stores the alignment actions performed in the past. The actions are denoted as $A_{t-1}, \ldots, A_1$ and are encoded as one-hot vectors $\alpha_{t-1}, \ldots, \alpha_1$. The action stack 450 allows the capture of patterns in the historic actions. In the action stack 450, information flows from the first action to the immediate past, with the last hidden state denoted $h_{t-1}^A$.

In an embodiment, the neural network 400 includes a fourth stack, the matched stack 460. The matched stack 460 includes text and video that has been matched previously. The most recently matched content is placed at the top of the matched stack 460. This can be denoted $R_1, \ldots, R_L$. Like the action stack 450, in the matched stack 460 the information flows from the past to the present. In this embodiment, it is assumed that a particular sentence $s_i$ can match multiple video clips $v_1, \ldots, v_k$. The video clips matching a particular sentence can be mean pooled, since the content is likely similar. The input to an LSTM unit is therefore the concatenation of the two modalities $r_i=[s_i, v_i]$. The last hidden state of the matched stack is $h_{t-1}^M$.

In an embodiment, at every time step the state of the four stacks 420, 430, 450, and 460 is $\psi_t=(v_{t+}, s_{t+}, A_{(t-1)-}, R_{1+})$. In this expression, $X_{t+}$ is shorthand for the sequence $X_t$, $X_{t+1}, \ldots$ Similarly, $X_{t-}$ is shorthand for the sequence $X_t$, $X_{t-1}, \ldots$ The conditional probability of alignment action $A_t$ at time t is:

$$P(A_t|\psi_t)=P(A_t|h_t^V,h_t^S,h_{t-1}^A,h_{t-1}^M)$$

In an embodiment, the expression above can be implemented as a softmax operation after two fully connected layers (e.g., fully connected layers 402 and 404 illustrated in FIG. 8). Further, in an embodiment, a rectified linear unit (ReLU) can be included for activation on top of the concatenated state $\psi_t=[h_t^V,h_t^S,t_{t-1}^A,h_{t-1}^M]$. In other embodiments, other activation functions could be used instead of ReLU activation.

The entire chain of sequences can be computed by applying the chain rule:

$$P(A_1, \ldots, A_N \mid V, S) = \prod_{t=1}^{N} P(A_t \mid A_{(t-1)-}, \psi_t)$$

The probability can be optimized greedily by choosing the most probable action, or by using beam search. The classification can be trained in a supervised manner. From a ground truth alignment of two sequences, one can derive a correct sequence of actions, which are used in training. When there is more than one correct action sequence, one action sequence can be randomly picked. The training objective is to minimize the cross-entropy loss at every time step.

Figure 9:
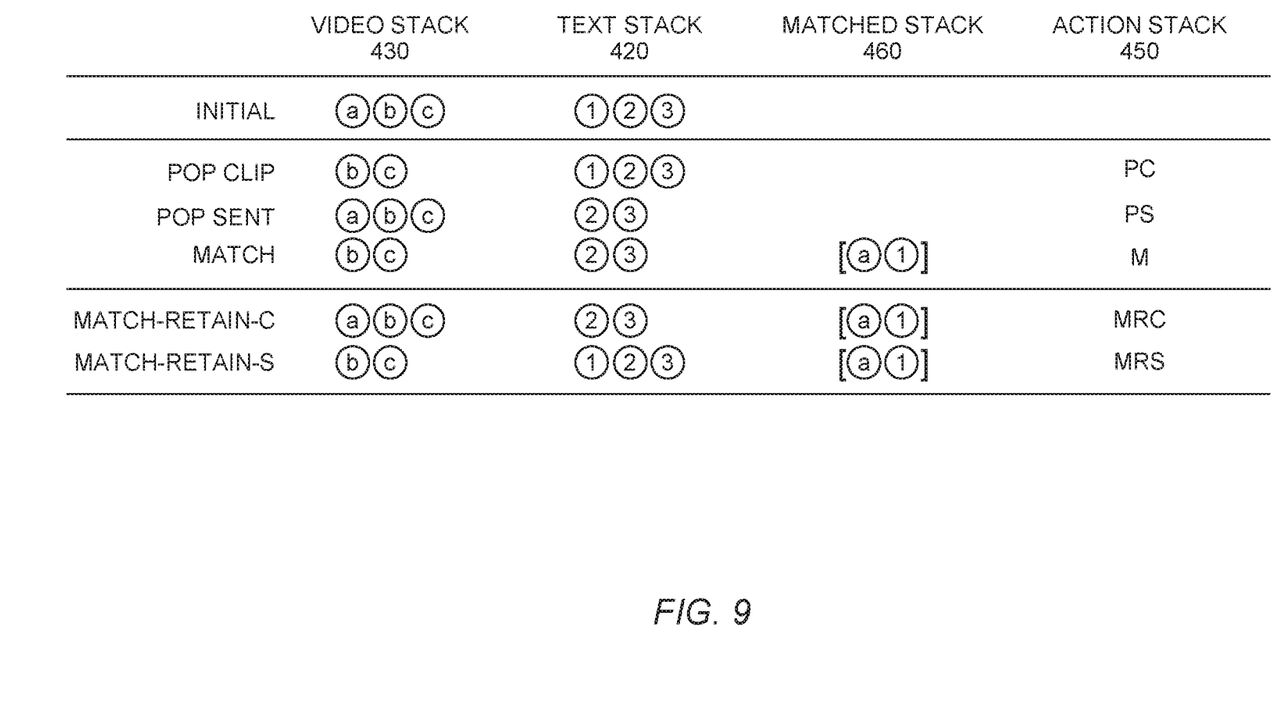
FIG. 9 is a table illustrating alignment of text and video data using a neural network, according to an embodiment.

In an embodiment, the neural network 400 includes the basic alignment actions 470. These basic actions include Pop Clip (PC), Pop Sentence (PS), Match (M), Match-Retain Clip (MRC), and Match-Retain Sentence (MRS). FIG. 9 illustrates these basic actions. The Pop Clip action removes the top element, $V_t$, from the video stack 430. This could be done when, for example, $V_t$ does not match any element in the text stack 420. The Pop Sentence action removes the top element, $S_t$, from the text stack 420. The Match action removes both $V_t$ and $S_t$, matches them, and pushes them to the matched stack 460. After each action is taken, it is retained on the action stack 450.

The actions Match-Retain Clip and Match-Retain Sentence are used for one-to-many correspondence. When many sentences can be matched with one video clip, the Match-Retain Clip action pops $S_t$, matches it with $V_t$ and pushes the pair to the matched stack 460, but $V_t$ stays on the video stack 430 for the next possible sentence. To pop $V_t$, the Pop Clip action must be used. The Match-Retain Sentence action is similar, except applying to a sentence instead of a video clip. In this example, matching is always between elements at the top of the stacks.

While FIG. 9 illustrates the use of all five actions, as an example illustration, the five actions do not have to be used together. A subset can be picked based on knowledge about the sequences being matched. For example, for one-to-one matching, if it is known that some clips may not match any sentences, but every sentence will have at least one matching clip, only Pop Clip and Match can be used. Alternatively, in a many-to-one scenario where (1) one sentence can match multiple video clips, (2) some clips are unmatched, and (3) every sentence has at least one matching clip, one can use only Pop Clip, Pop Sentence, and Match-Retain Sentence. It can be desirable to choose fewer actions, because it simplifies training and reduces the branching factor during inference.

Returning to FIG. 8, the neural network 400 includes the action stack 450. The action stack is particularly apparent in the one-to-many setting, for example where multiple video clips could correspond to one textual sentence. As discussed earlier, in an embodiment, to encode an element R1 in the matched stack, features from different video clips can be mean-pooled. As a result, if the algorithm needs to learn a constraint on how many clips can be merged together, features from the matched stack 460 may not be effective, but features from the action stack 450 can carry the information.

In an embodiment, the use of the basic actions 470 is sufficient for alignment of two sequences. When aligning more than two sequences simultaneously, like video, audio, and textual sequences, the parameterized actions 490 can be used. For example, the parameterized Match-Retain action (M-R(000)) can track three sequences. In this example, the parameters are a 3-bit binary vector where 1 indicates the top element from this sequence is being matched and 0 indicates otherwise. The parameterized action Match-With-History (MwH(q)) has a single parameter q that indicates a position on the matched stack. The matched stack can be indexed using known methods, for example the method described in O. Vinyals, M. Fortunato, and N. Jaitly, *Pointer Networks*, 28 Advances in Neural Information Processing Systems (NIPS) 2692 (2015). The probability of choosing the $i^{th}$ matched element $r_i$ is shown below, where the matrix $W_q$ and the vector v are trainable parameters and L is the length of the matched stack:

$$P(q = i \mid \psi_t) = \frac{\exp(f(\psi_t, r_i))}{\sum_{j=0}^{L} \exp(f(\psi_t, r_j))}$$

$$f(\psi_t, r_i) = v^T \tanh\left(W_q \begin{bmatrix} \psi_t \\ r_i \end{bmatrix}\right)$$

Figure 10:
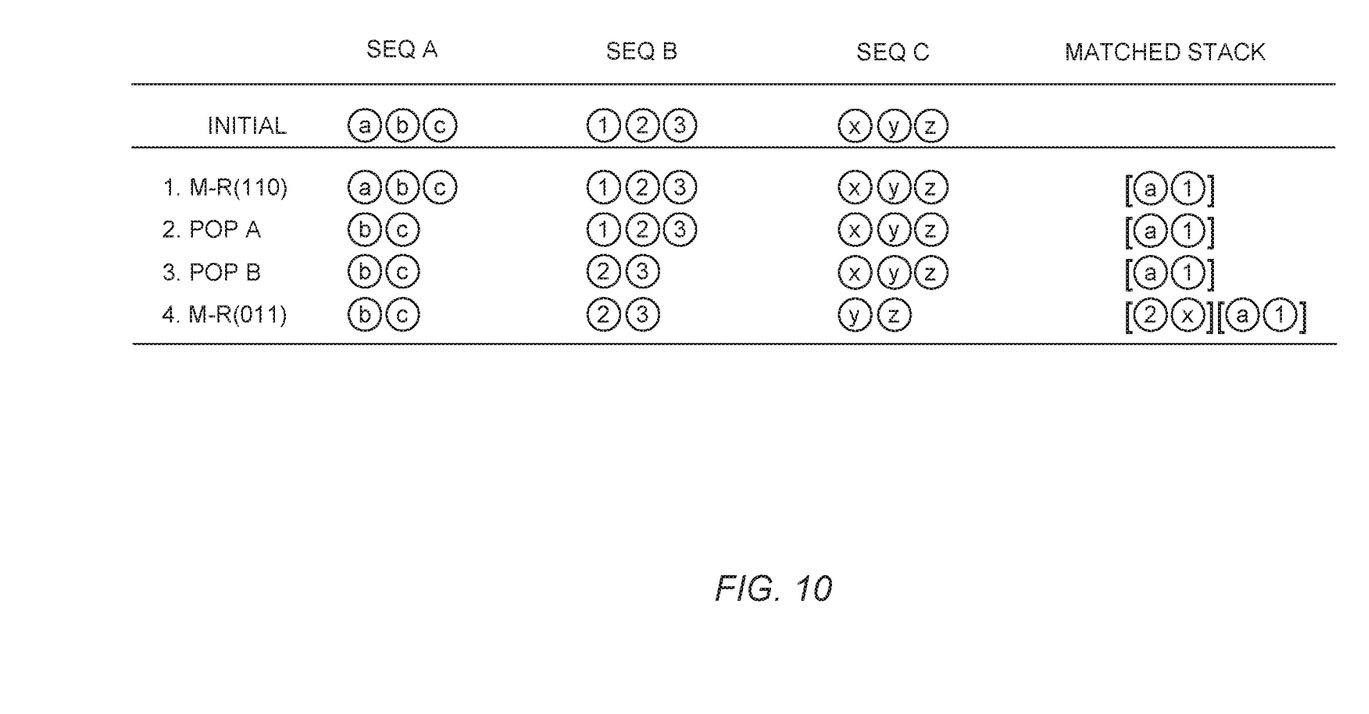
FIG. 10 is a table illustrating alignment of three sequential data sequences, using a neural network, according to an embodiment.

FIG. 10 illustrates the parameterized actions 490. For example, to match the top elements from Sequence A and Sequence B, the action is Match-Retain (110), which matches the first two elements. The parameters can be implemented as three separate binary predictions. The actions Pop A and Pop B remove the respective top elements from Sequence A and Sequence B. The action Match-Retain (011) matches the top element from sequence B with the top element from sequence C.

Returning to FIG. 8, the configurations illustrated in FIGS. 4 and 6-8 are merely an example embodiment. A person of ordinary skill in the art will understand that other suitable configurations are possible. In this example, the implementation details below can be used in optimizing the system. But these details are not limiting, and are merely provided as examples suitable for some embodiments.

For example, for one-to-one matching with null video clips, the actions Pop Clip and Match can be used. For one-to-many matching with null video clips, the actions Pop Clip, Pop Sentence, and Match-Retain Sentence can be used. For joint pre-training, 500 dimensions can be used for the LSTM sentence encoder and 300 dimensions can be used for the joint embeddings. The dimensions of the word and image embedding can be 300 and 4096, respectively, while the margin in the ranking objective function can be $\alpha$=0.05. $L_2$ regularization can be used to prevent over-fitting. The batch size can be set to 32 and the number of contrastive samples can be 31 for every positive pair. The neural network (e.g., the neural network 400) can be trained with the Adam optimizer using a learning rate of $10^{-4}$ and gradient clipping of 2.0. Early stopping on the validation set can be used to avoid over-fitting. The network can use 300 dimensions for the video and text stacks, 20 dimensions for the matched stack, and 8 dimensions for the action stack. Optionally, two additional variables can be fed into a fully connected layer: the number of elements left in the video and text stacks. This can improve the performance on very long sequences. The network (e.g., the neural network 400) can be first trained with the encoding networks, fixed with a learning rate of 0.001. After that, the network can be trained end-to-end with a learning rate of $10^{-5}$.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
   receiving video data in a media presentation and textual data corresponding to content of the media presentation at an alignment neural network previously trained to align training video data and training textual data;
   determining a first action related to aligning the video data and the textual data using the trained alignment neural network, such that the video data and the textual data are at least partially aligned following the first action, the trained alignment neural network comprising:
     a first fully connected layer that receives as input:
       the video data,
       the textual data, and
       data relating to a previously determined action by the trained alignment neural network related to aligning the video data and the textual data; and
   performing the first action related to aligning the video data and the textual data.

2. The method of claim 1, wherein the data relating to the previously determined action by the trained alignment neural network comprises:
   data relating to a previously determined match between the video data and the textual data.

3. The method of claim 1, wherein the trained alignment neural network further comprises a second fully connected layer that receives as input data from the first fully connected layer.

4. The method of claim 1, further comprising storing data related to the first action.

5. The method of claim 1, wherein the first action comprises at least one of: a pop action related to the video data, a pop action related to the textual data, a match action, or a match-retain action.

6. The method of claim 1, wherein the first action comprises a match action.

7. The method of claim 1, further comprising:
receiving audio data, wherein the first action relates to aligning the video data, the textual data, and the audio data.

8. The method of claim 7, wherein the first action is a parameterized action.

9. The method of claim 1, wherein the video data comprises a feature vector generated based on mean pooling a plurality of video frames.

10. A computer program product, comprising:
a non-transitory computer-readable storage medium having computer-readable program code embodied therewith, the computer-readable program code configured to perform one or more operations comprising:
receiving video data in a media presentation and textual data corresponding to content of the media presentation at an alignment neural network previously trained to align training video data and training textual data;
determining a first action related to aligning the video data and the textual data using the trained alignment neural network, such that the video data and the textual data are at least partially aligned following the first action, the trained alignment neural network comprising:
a first fully connected layer that receives as input:
the video data,
the textual data, and
data relating to a previously determined action by the trained alignment neural network related to aligning the video data and the textual data; and
performing the first action related to aligning the video data and the textual data.

11. The computer program product of claim 10, wherein the data relating to the previously determined action by the trained alignment neural network comprises
data relating to a previously determined match between the video data and the textual data.

12. The computer program product of claim 10, wherein the trained alignment neural network further comprises a second fully connected layer that receives as input data from the first fully connected layer.

13. The computer program product of claim 10, wherein the first action comprises at least one of: a pop action related to the video data, a pop action related to the textual data, a match action, or a match-retain action.

14. The computer program product of claim 10, wherein the first action comprises a match action.

15. The computer program product of claim 10, the operations further comprising:
receiving audio data, wherein the first action relates to aligning the video data, the textual data, and the audio data, and wherein the first action is a parameterized action.

16. A system, comprising:
a processor; and
a memory containing a program that, when executed on the processor, performs one or more operations comprising:
receiving video data in a media presentation and textual data corresponding to content of the media presentation at an alignment neural network previously trained to align video data and textual data;
determining a first action related to aligning the video data and the textual data using the trained alignment neural network, such that the video data and the textual data are at least partially aligned following the first action, the trained alignment neural network comprising:
a first fully connected layer that receives as input:
the video data,
the textual data, and
data relating to a previously determined action by the trained alignment neural network related to aligning the video data and the textual data; and
performing the first action related to aligning the video data and the textual data.

17. The system of claim 16, wherein the data relating to the previously determined action by the trained alignment neural network comprises:
data relating to a previously determined match between the video data and the textual data.

18. The system of claim 16, wherein the trained alignment neural network further comprises a second fully connected layer that receives as input data from the first fully connected layer.

19. The system of claim 16, wherein the first action comprises a match action.

20. The system of claim 16, the operations further comprising:
receiving audio data, wherein the first action relates to aligning the video data, the textual data, and the audio data, and wherein the first action is a parameterized action.

* * * * *

UNITED STATES PATENT AND TRADEMARK OFFICE
CERTIFICATE OF CORRECTION

PATENT NO.         : 10,956,685 B2
APPLICATION NO.    : 16/786804
DATED              : March 23, 2021
INVENTOR(S)        : Boyang Li et al.

Page 1 of 1

It is certified that error appears in the above-identified patent and that said Letters Patent is hereby corrected as shown below:

In the Specification

In Column 8, Line 1, delete "$h_t^{(1)}$" and insert -- $c_t^{(1)}$ --, therefor.

In Column 8, Line 45, after "$\|^2$" insert -- . --.

In Column 9, Line 66, delete "($v_{t+}$, $s_{t+}$," and insert -- ($V_{t+}$, $S_{t+}$, --, therefor.

In Column 11, Line 5, delete "R1" and insert -- $R_i$ --, therefor.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*